United States Patent [19]

Anderson

[11] Patent Number: 4,661,778

[45] Date of Patent: Apr. 28, 1987

[54] IGNITION DIAGNOSTIC MONITOR

[75] Inventor: Robert L. Anderson, Saline, Mich.

[73] Assignee: Ford Motor Company, Dearborn, Mich.

[21] Appl. No.: 647,304

[22] Filed: Sep. 4, 1984

[51] Int. Cl.[4] .......... H04B 1/04; F02P 17/00

[52] U.S. Cl. .......... 324/380; 328/120; 324/392

[58] Field of Search .......... 307/234, 517, 518, 525; 328/120, 109, 111; 364/551; 73/116; 324/392, 384, 379-382; 361/153

[56] References Cited

U.S. PATENT DOCUMENTS

| | | | |
|---|---|---|---|
| 2,847,565 | 8/1958 | Clapper | 328/120 |
| 3,068,367 | 12/1962 | Brown | 328/120 |
| 3,409,824 | 11/1968 | Makuh | 324/379 |
| 3,496,477 | 2/1970 | Page | 328/120 |
| 3,617,905 | 11/1971 | Castelli | 328/120 |
| 3,908,366 | 9/1975 | Masaki . | |
| 3,965,677 | 6/1976 | Goto et al. . | |
| 3,970,872 | 7/1976 | Kuhn et al. . | |
| 4,040,294 | 9/1977 | Matsuda et al. . | |
| 4,373,186 | 2/1983 | Marshall | 364/551 |

OTHER PUBLICATIONS

Frappier: "Single NAND-Gate Quad . . . "-Electronic Design-Aug. 20, 1981-pp. 158-159.

*Primary Examiner*—Reinhard J. Eisenzopf
*Assistant Examiner*—Jose M. Solis
*Attorney, Agent, or Firm*—Peter Abolins; Keith L. Zerschling

[57] ABSTRACT

An ignition diagnostic monitor detects ignition malfunction. A first monostable multivibrator is coupled to an ignition module to receive the ignition signal and maintain a first logic state for a predetermined first time constant after detecting an ignition signal. The monostable multivibrator maintains a second logic level state after passage of the predetermined time constant until detection of another ignition signal occurs. The second logic level indicates a missed ignition signal and an ignition fault. A control module is coupled to the ignition module and the monostable multivibrator and receives a fault detection signal from the monostable multivibrator.

1 Claim, 6 Drawing Figures

FIG.3
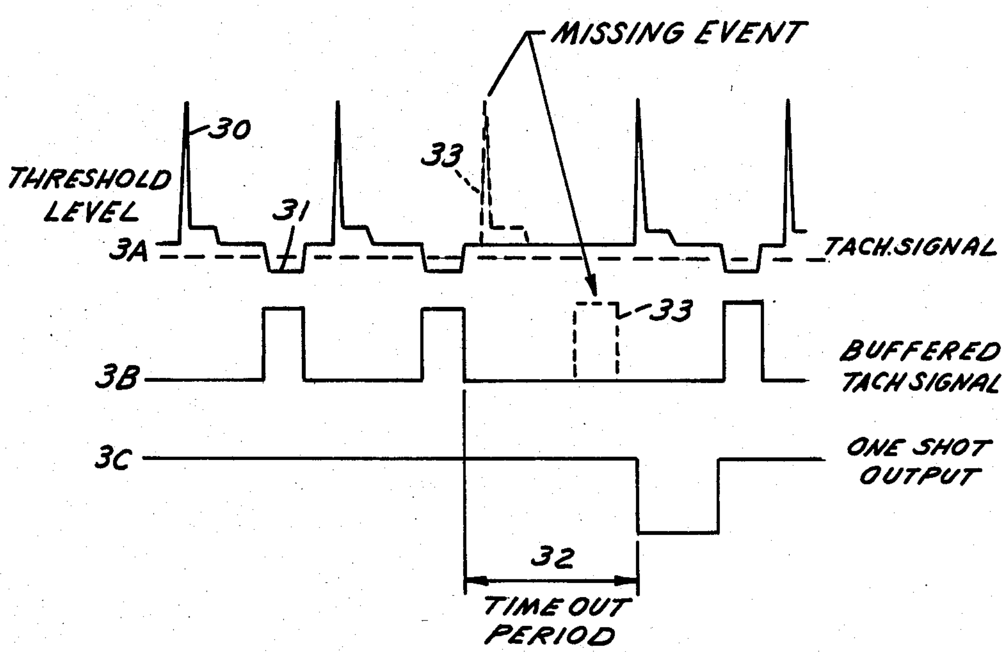
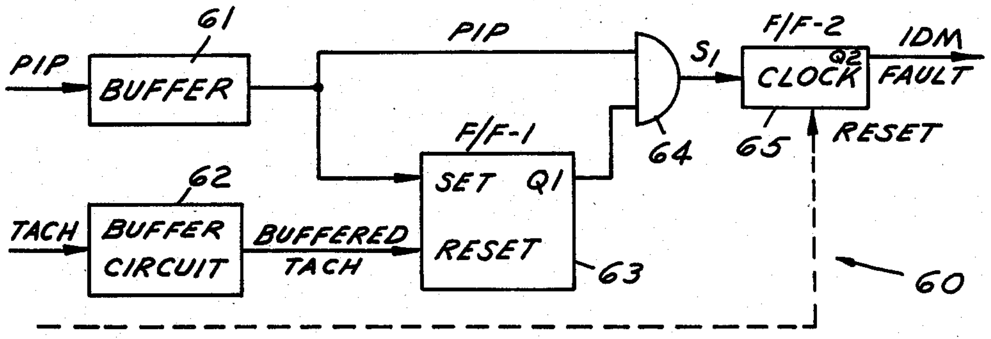
FIG.5

IGNITION DIAGNOSTIC MONITOR

BACKGROUND OF THE INVENTION

1. Field of the Invention

This invention relates to an engine ignition system.

2. Prior Art

Electronic engine control systems are known which include spark timing control as one of the controlled parameters. Spark timing is determined as a function of engine rpm and engine load by a software program in a microcontroller. For example, timing reference for spark timing can be obtained from a profile ignition pickup (PIP) or crankshaft position sensor. An ignition module is coupled to the engine control computer and receives timing information from the controller. The ignition module provides the power necessary to drive the ignition coil. Because of the complex nature of the system, failure to produce a spark can be due to failure of any of the components, such as, for example, the crankshaft (PIP) sensor, the processor control module or the ignition control module. Several methods for monitoring the primary ignition system operation and detecting, storing, and, in some cases, isolating faults would be desirable. These are some of the problems this invention overcomes.

U.S. Pat. No. 3,970,872 issued to Kuhn et al teaches a circuit for analyzing ignition voltage waveforms of an internal combustion engine. The circuit includes a monostable multivibrator which is triggered in response to the detection of a spark pulse to generate a blanking voltage. A trigger blanking voltage is useful in analyzing ignition voltage waveforms. After initial triggering occurs, it may be desirable to blank out further triggering signals which might occur during the course of ignition and which could reinitiate a measuring or analysis cycle. Connected to the output of the monostable multivibrator is a capacitor charging circuit with an electrode of the capacitor therein coupled back to the RC circuit which determines the duration of the unstable state of the flip flop.

U.S. Pat. No. 3,965,677 issued to Goto et al and U.S. Pat. No. 3,908,366 issued to Masaki teach misfire detecting apparatuses for internal combustion engines. The patent to Goto et al detects misfiring by monitoring exhaust gas pressure and the patent to Masaki detects misfiring by using a gas current pulse generator in the exhaust manifold of the engine.

U.S. Pat. No. 4,040,294 issued to Matsuda et al teaches an apparatus for detecting misfire in an internal combustion engine in which misfire is detected by monitoring the change in the tone of the exhaust sound. These three patents involve detection of a misfire in the cylinder, whether or not it is due to a missing spark. Accordingly, detection of such a fault could not be attributed to a missing spark. For example, poor air fuel ratio could also be a cause. It would be desirable to have an ignition diagnostic monitor circuit to detect the loss of an ignition coil primary coil pulse and to use the microcomputer of an engine control system to detect and store the fault in a keep-alive memory for later retrieval by a service technician. Additonally, it would be desirable to isolate and identify the source of the fault.

SUMMARY OF THE INVENTION

An ignition diagnostic monitor in accordance with an embodiment of this invention detects ignition malfunction. In one embodiment, the output of an ignition module applied to an ignition coil is monitored by a one-shot multivibrator to detect missing firing signals. The multivibrator maintains a first logic state for a predetermined first time constant after detecting an ignition signal. If no ignition signal is detected, the multivibrator maintains a stable second logic level state after passage of the predetermined first time constant until detection of another ignition signal. The second logic level output indicates a missed ignition signal and an ignition fault. A control means is coupled to the ignition module and the multivibrator for receiving a fault detection signal from the multivibrator.

BRIEF DESCRIPTION OF THE DRAWINGS

FIG. 3 is a graphical representation with respect to time of the ignition signal, the buffered ignition signal and the output of a monostable multivibrator in accordance with an embodiment of this invention;

FIG. 5 is a block diagram of a fault detection circuit using logic blocks in accordance with an embodiment of this invention.

DETAILED DESCRIPTION OF THE INVENTION

Figure 1:
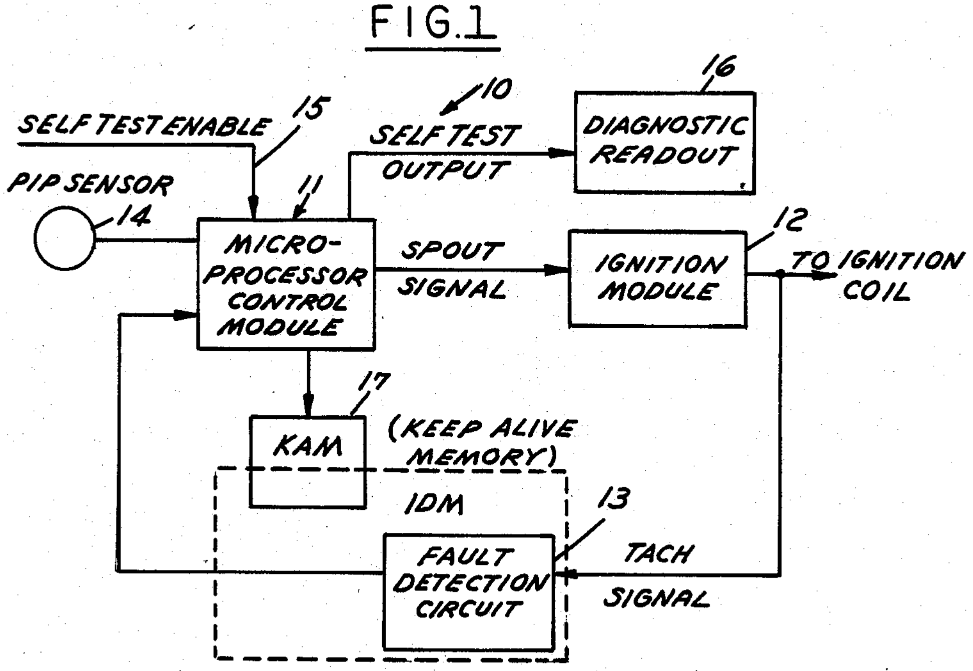
FIG. 1 is a block diagram of an engine control system including an ignition fault detection circuit in accordance with an embodiment of this invenlion.

Referring to FIG. 1, an engine control system 10 includes a central microprocessor control module 11 which provides a spark initiation signal to an ignition module 12. A fault detection circuit 13 is coupled from the output of ignition module 12 to the input of control module 11. Other inputs to control module 11 include a signal from a crankshaft position (PIP) indicator 14 and a signal for a diagnostic control 15. Outputs from control module 11, in addition to the signal to ignition module 12, include a self-test output to a diagnostic readout 16 and an output to a keep-alive memory 17.

Figure 2:
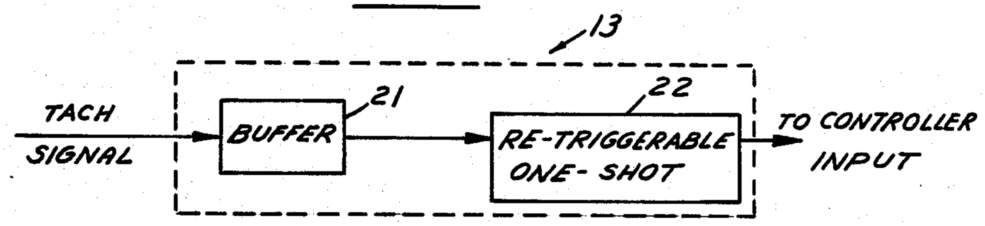
FIG. 2 is a more detailed block diagram of a fault detection circuit block of FIG. 1.

Referring to FIG. 2, fault detection circuit 13 can have an embodiment wherein the signal from ignition module 12 is applied to a buffer 21 which in turn applies a signal to a retriggerable one-shot multivibrator 22.

Referring to FIG. 3, during operation of the circuit of FIG. 2, the output ignition module 12 is shown on line 3A as a TACH signal. The initial spike 30 is the induced voltage in the primary during the spark event. The reduced voltage plateau 31 is the voltage during conduction in the primary coil or dwell. The signal on line 3B with respect to time is the output of buffer 21 which is responsive to the plateau 31 and produces a square wave. Line 3C shows the output of retriggerable one-shot multivibrator 22. A predetermined time constant 32 causes the output of multivibrator 22 to remain at a high logic level as long as it is retriggered before the expiration of the period 32. Line 3A and 3B contain missing spark events 33 which cause the time period 32 to expire in the output of multivibrator 22 to go to a low logic level which indicates a fault, that is, the missing event.

Figure 4:
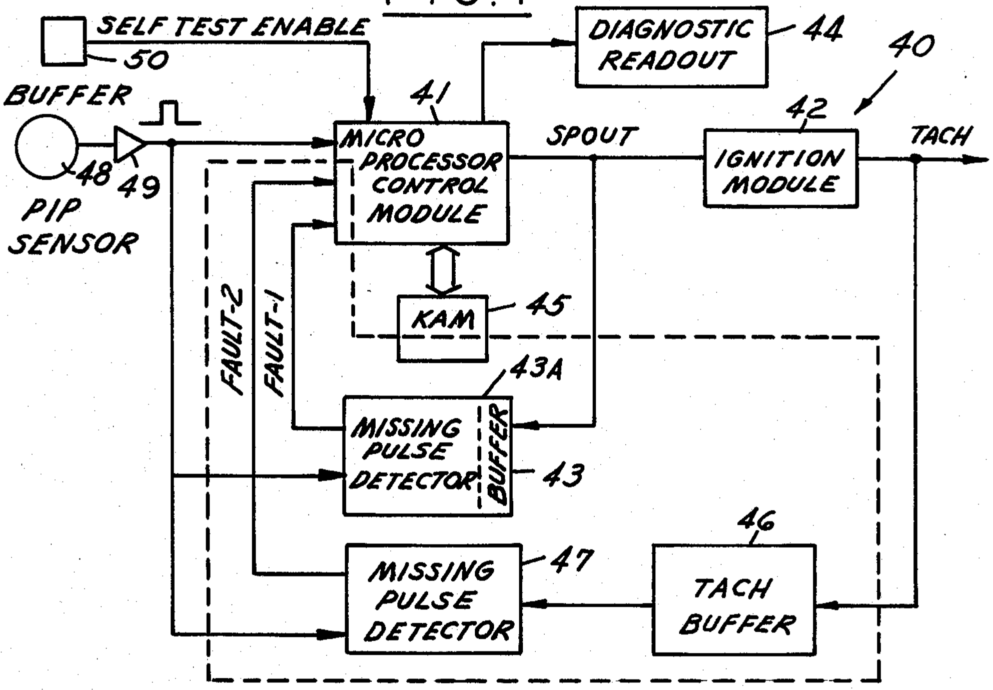
FIG. 4 is a block diagram of an engine control system including an ignition fault detection and isolation circuit in accordance with an embodiment of this invention.

In operation, the output of one-shot multivibrator 22 is applied to an input of microprocessor control module 11. Processing by microprocessor control module 11 identifies, counts and stores in a keep-alive memory (KAM) 17 fault messages for later retrieval by service technicians. That is, the occurrence of an intermittent ignition fault is stored and can later be id Referring to FIG. 4, the schematic includes a dual detection technique and fault isolation system 40. In addition to monitoring the tachometer (TACH) output as in the system of FIG. 1, the spark command output (SPOUT) is monitored. The output of the detection circuit detecting SPOUT and the output of the detection circuit detecting TACH is applied to a microprocessor control module wherein a software subroutine is used to determine whether a loss of the TACH signal is due to an ignition module failure alone (no loss of SPOUT) or due to some fault in the control module (simultaneous loss of SPOUT and TACH signal).

Dual detection and fault isolation system 40 has a microprocessor 41 with outputs coupled to an ignition module 42, a missing pulse detector 43, a diagnostic readout 44, and a keep-alive memory 45. The output from ignition module 42 is connected to a tachometer buffer 46. In turn, the output of tachometer buffer 46 is applied to a missing pulse detector 47. A profile ignition pulse sensor 48 has an output applied to a buffer 49 which in turn applies the buffered signal to microprocessor control module 41, missing pulse detector 43, and missing pulse detector 47. The outputs of missing pulse detector 43 and missing pulse detector 47 are applied to microprocessor control module 41. Microprocessor control module 41 also receives an input from a self-test enable source 50 and from keep-alive memory 45.

In operation, missing pulse detector 43 detects the occurrence of timing pulses applied to ignition module 42 and maintains a first logic state for a predetermined time constant after detecting a timing pulse. Further, missing pulse detector 43 maintains a stable second logic level state after passage of the predetermined time constant until the detection of another timing pulse. The second logic level output from missing pulse detector 43 indicates a missed timing pulse and an ignition fault prior to ignition module 42. Advantageously, missing pulse detector 43 includes a buffer 43A at the input of missing pulse detector 43. The time constant associated with missing pulse detector 43 is longer than the time period between successive timing pulses applied to ignition module 42 and less than twice the time period between successive timing pulses applied to ignition module 42. As a result, the time constant for a missing pulse detector 43, after being initiated by a first timing pulse, terminates between the second and third timing pulses after the first timing pulse. Missing pulse detector 43 can be a one shot multivibrator having an activated output state longer than the time between successive ignition spark events so that a missing ignition spark event causes a change in the ignition output and an uninterrupted sequence of ignition spark events keeps the retriggerable one-shot multivibrator triggered with a single continuous logic state output.

Referring to FIG. 5, an embodiment of missing pulse detector 43 can be of a toggle circuit design using flip-flops instead of multivibrators. Toggle circuit 60 includes a profile ignition pulse supplied to a buffer 61 and a tachometer signal applied to a buffer 62. A flip flop 63 has a reset input coupled to the output of buffer circuit 62 and a set input coupled to the output of buffer 61. An output Q1 of flip-flop 63 is applied to one input of an AND gate 64. The other input of AND gate 64 is coupled to the output of buffer 61. The output of AND gate 64 is applied to a clock flip-flop 65. An output Q2 from flip-flop 65 indicates the existence of a fault in the ignition system. Clock flip-flop 65 can also be reset by the application of a signal to the reset input.

The system shown in FIG. 5 will detect loss of a single spark event, independent of the period between pulses. The circuit uses two flip-flop circuits 63, 65 to determine if a TACH signal occurs for every PIP, ignition pulse, event. In operation, flip-flop 63 is set by shaped PIP pulses and reset by the next buffered TACH signal. If a system fault occurs, such that a TACH pulse does not occur before another PIP pulse, flip-flop 63 remains set and allows the next PIP pulse to toggle flip-flop 65. The change of state of flip-flop 65 is used to signal a fault to microprocessor control module 41. The software routine can be designed to acknowledge the ignition diagnostic module fault signal in at least two ways. First, one technique would be to have the software respond to every change in state of the Q2 output of flip-flop 65 and keep the total of the number of Q2 transitions in a keep-alive memory. An alternate approach would be to have the Q2 signal transition (i.e. the positive going edge) trigger an interrupt, and a subroutine would record the fault, then clear flip-flop 65.

Figure 6:
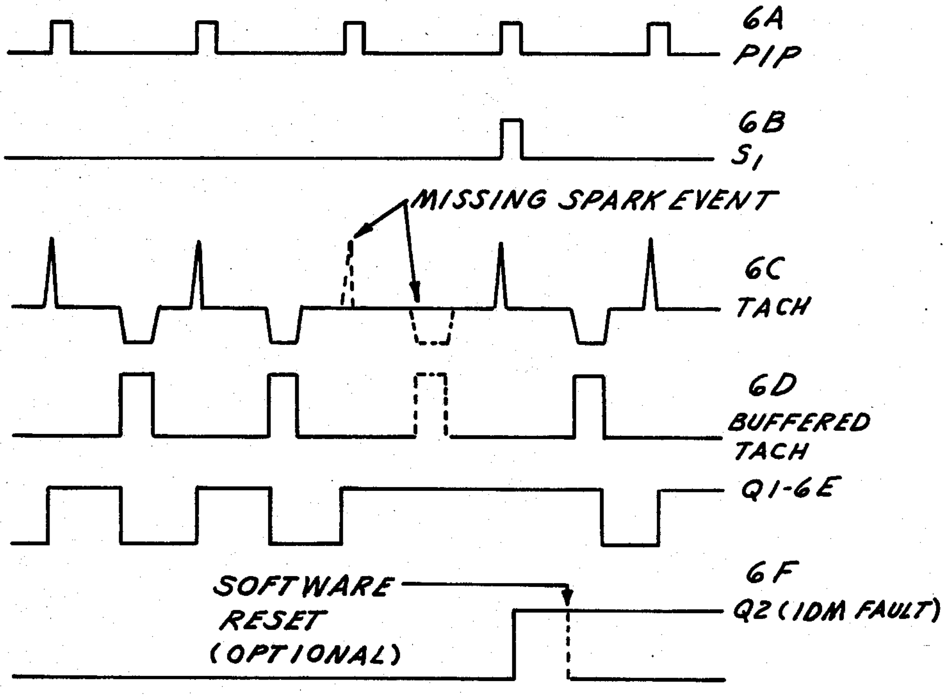
FIG. 6 is a graphical representation with respect to time of signals related to the apparatus of FIG. 5 in accordance with an embodiment of this invention.

Referring to FIG. 6, during operation of the circuit of FIG. 5, the input to buffer 61 is shown on line 6A, the output of AND circuit 64 shown on line 6B, the input to buffer circuit 62 is shown on line 6C, the output of buffered circuit 62 is shown on line 6D, the output of flip-flop 63 at Q1 is shown on line 6E, and the output of flip-flop 65 at Q2 is shown on line 6F.

Line 6C, indicating the tachometer signal, has peaks rising from a base line indicating spark events. Troughs descending from the base line indicate the recharging of the ignition coil. An automatic software reset (dotted line in FIG. 5) can be applied to clock flip-flop 65 so that flip-flop 65 is returned to its steady state nonfault indicating logic level. This is indicated by a dotted line on line 6F wherein the Q2 output returns to its base level.

Various modifications and variations will no doubt occur to those skilled in the arts to which this invention pertains. For example, the embodiment of the multivibrator may be varied from that disclosed herein. These and all other variations which basically rely on the teachings through which this disclosure has advanced the art are properly considered within the scope of this invention.

I claim:

1. An ignition diagnostic monitor for detecting a ignition malfunction in an internal combustion engine having an engine control module coupled to an ignition module, said ignition dignostic monitor including:

PIP means for monitoring crankshaft position of an engine and providing an input to the engine control module;

SPOUT means for monitoring the occurrence of a signal from the engine control module for initiating an ignition spark;

a SPOUT comparison means for comparing the output of said PIP means and SPOUT means to detect faulty operation in the engine control module;

said SPOUT comparison means including a first flip-flop circuit having a reset input coupled to the output of said SPOUT means, a set input having a set input coupled to said PIP means an AND gate having a first input coupled to said PIP means and a second input coupled to the output of said first flip-flop circuit, a second flip-flop circuit having an input coupled to the output of said AND gate ad an output indicating a missed ignition pulse;

said second flip-flop circuit having a reset input coupled to a reset signal for resetting the logic level of the output of said second flip-flop circuit;

TACH means for monitoring the occurrence of a signal from the ignition module for initiating the occurrence of an igition spark;

a TACH comparison means for comparing the output of said TACH means and said PIP means to detect faulty operation in the combination of the ignition module and the engine control module; and a keep-alive memory means coupled to said SPOUT comparison means for storing a detected faulty operation of the engine control module and to said TACH comparison means for storing a detecting faulty operation of the combination of the ignition module and the engine control module.

* * * * *